United States Patent [19]

Hoek et al.

[11] Patent Number: 5,189,832
[45] Date of Patent: Mar. 2, 1993

[54] DEVICE FOR THERMALLY KILLING WEEDS

[75] Inventors: Hendrik J. Hoek, Soest; Hendrikus G. Hoogenboom, Utrecht, both of Netherlands

[73] Assignee: HOAF Apparatenfabriek B.V., Nijkerk, Netherlands

[21] Appl. No.: 641,060

[22] Filed: Jan. 14, 1991

[30] Foreign Application Priority Data

Jan. 15, 1990 [NL] Netherlands ................ 9000092

[51] Int. Cl.⁵ ............................................. A01M 15/00
[52] U.S. Cl. ................................... 47/1.44; 126/271.1
[58] Field of Search ................................ 47/1.7, 1.44; 126/271.1, 271.2; 432/207, 208

[56] References Cited

U.S. PATENT DOCUMENTS

| | | | |
|---|---|---|---|
| 2,531,884 | 11/1950 | McLemore | 47/1.44 |
| 3,147,568 | 9/1964 | Inhoter | 47/1.7 |
| 4,088,122 | 5/1978 | Miles | 47/1.44 |
| 5,028,002 | 7/1991 | Whitford | 47/1.7 |

Primary Examiner—Henry E. Raduazo
Attorney, Agent, or Firm—Bachman & LaPointe

[57] ABSTRACT

A device for thermally killing weeds near plants of a valuable crop arranged in rows is provided with a frame which can be moved in the direction of the rows of plants, one or more burners fixed to the frame, the nozzles of which are directed at the ground or just above the ground, a discharge for combustion gases fitted at some distance opposite the burner nozzles, and a feed for feeding in cooling medium to form a cooling curtain at some distance above the place where the combustion gases of the burners will touch the ground. In order to kill only the weeds directly around the plant stems and also to prevent the combustion gases from flowing up along the plant stems, the outflow direction of the burners runs essentially at right angles relative to the direction of movement of the frame, and the discharge for discharging cooling medium are fixed to the frame at some horizontal distance opposite the cooling medium feed.

7 Claims, 2 Drawing Sheets

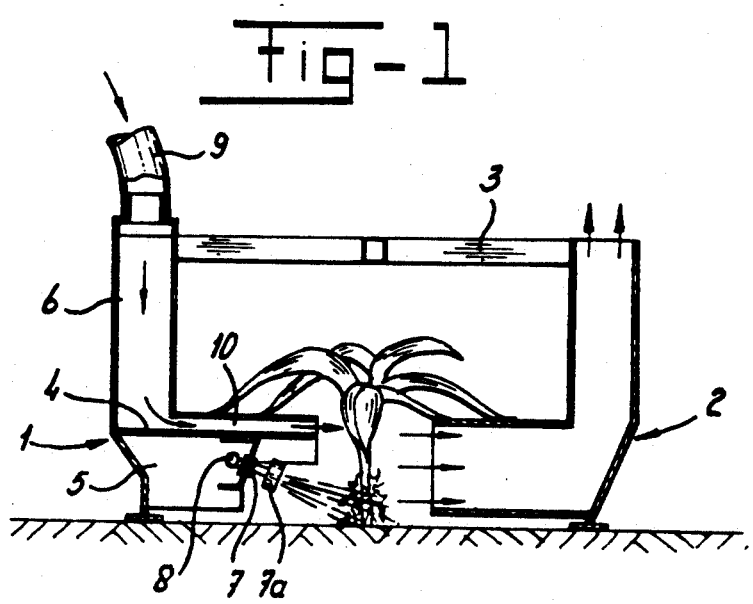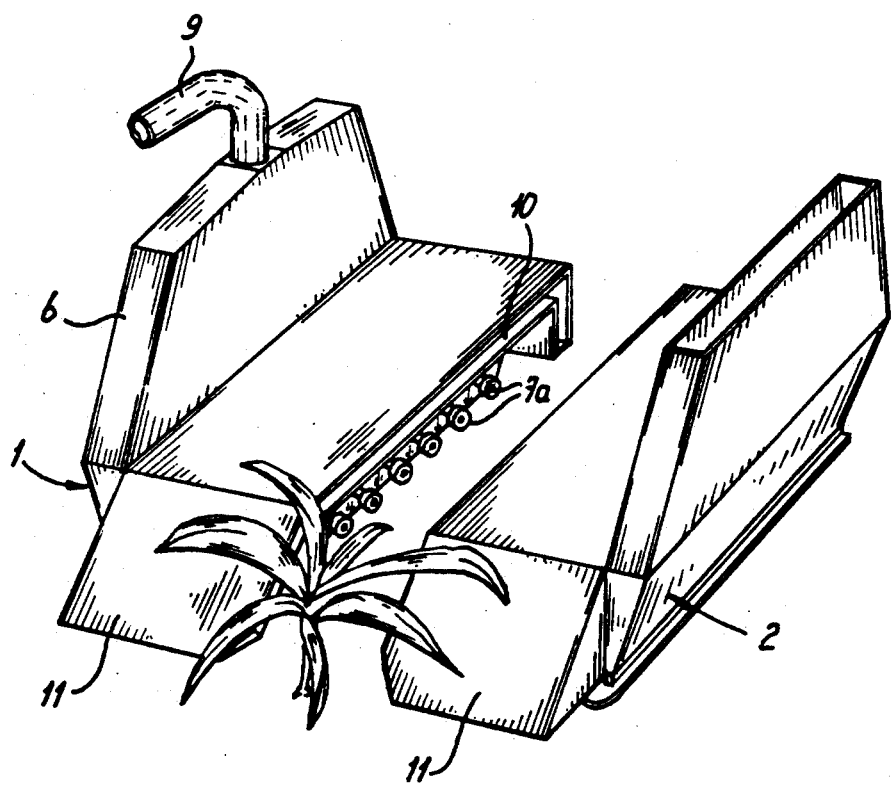

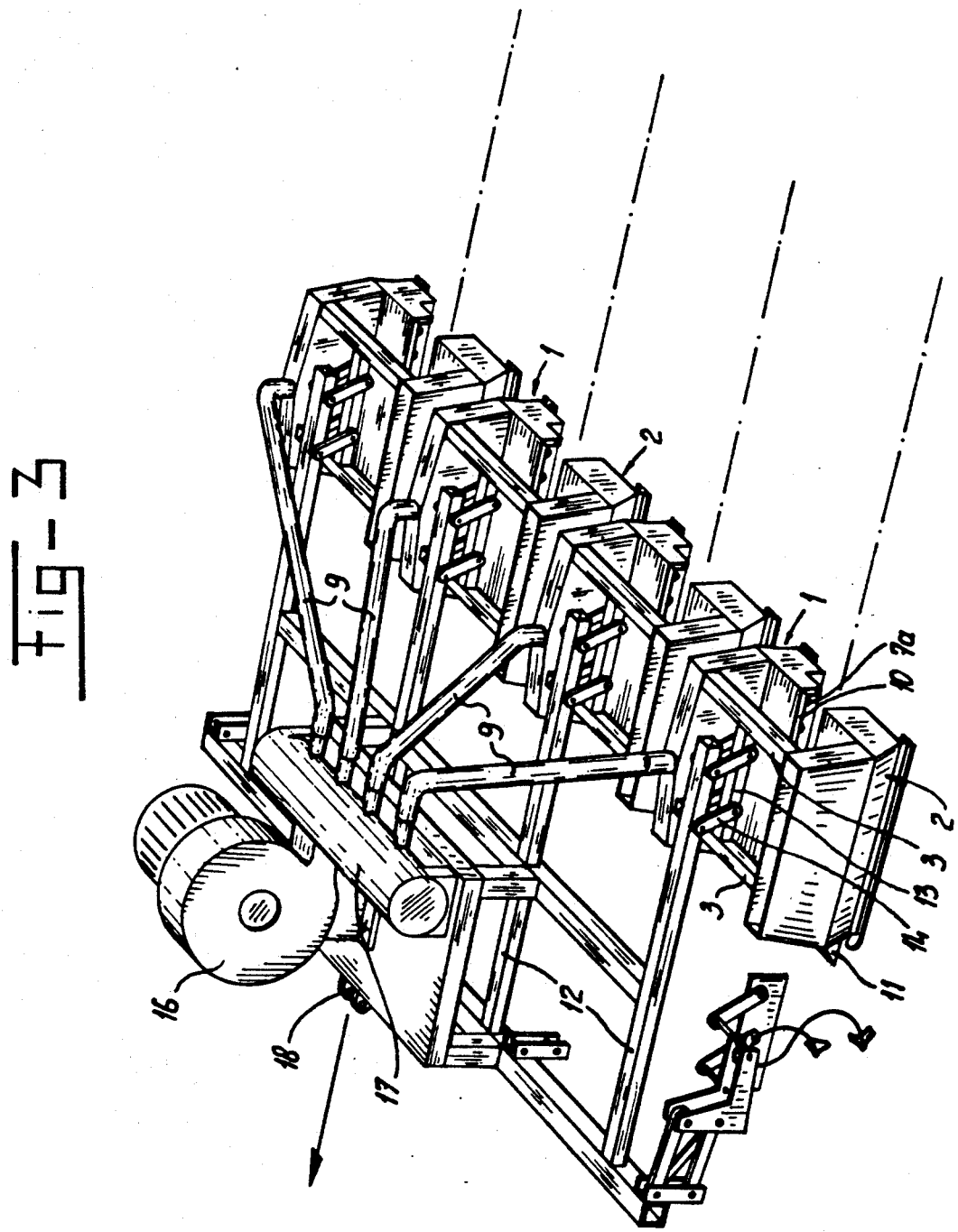

DEVICE FOR THERMALLY KILLING WEEDS

BACKGROUND OF THE INVENTION

The invention relates to a device for thermally killing weeds near plants of a valuable crop arranged in rows, comprising a frame which is intended to be moved in the direction of the rows of plants, one or more burners fixed to the frame, the nozzles of which are directed at or just above the ground, discharge means for combustion gases fitted at some distance opposite the burner nozzles, and feed means for feeding in cooling medium to form a cooling curtain at some distance above the place where the combustion gases of the burners will touch the ground.

Such a device is known from U.S. Pat. No. 3,477,174.

Chemical herbicides are commonly used for killing weeds. They usually constitute a serious assault on the environment. Pollution of the soil and pollution of ground and surface water have become an increasing threat in recent years. Thermal killing of weeds has become known as an ecologically excellent alternative to chemicals. For some time now the Dutch firm HOAF Apparatenfabriek has been putting equipment on the market by means of which undesired vegetation is exposed for a short period to such a high temperature that the leaves and stems die off and seeds lying on the surface of the ground become infertile. Since the duration of heating is short, micro-organisms in the ground are not adversely affected. The burning of propane or another gaseous or liquid hydrocarbon produces infrared radiation which is aimed directly at the weeds. A disadvantage of the known method is that it is not suitable for killing weeds around the bottom part of the stems of cultivated crops such as young maize plants. Although the bottom part of the stems of those crops can itself withstand the very temporary heat, the rising heat still damages to top parts of the stems and the leaves of the plants. This problem is partially solved by the device according to U.S. Pat. No. 3,477,174. This device has a number of deflector plates which are situated close to the ground and are placed next to each other and spaced apart. The burners are placed in front of these deflector plates and the heat developed by the burners is concentrated below the deflector plates for thermally killing the weeds between the rows of plants. The gases flowing inwards and upwards through the openings between the deflector plates are concentrated around the base of the plants by the cooling curtain extending between and above the deflector plates. The combustion gases flow in one direction essentially parallel to the row of plants and at right angles to the cooling air stream coming out of air nozzles placed opposite each other. When the device is passing, the plant parts above the base of the plants are in a chamber in which both the hot combustion gases and the cooling air are flowing. The main disadvantage of this device is that the gas consumption will be high in order to kill both the weeds growing directly around the plant stems and the weeds between the rows of plants. The weeks between the rows of plants could be removed simply and cheaply by mechanical hoeing. Another disadvantage is that the hot combustion gases, although cooled by the air streams, move up along the plant stems in the above-mentioned chamber, so that the plant parts situated above the plant stems will still be heated.

SUMMARY OF THE INVENTION

The object of the invention is to avoid these disadvantages and provide a device of the type mentioned above, which with a low gas consumption kills only the weeds directly around the plant stems, and in which the combustion gases are prevented by the cooling curtain from flowing up along the plant stems.

According to the invention, the device is to this end characterized in that the outflow direction of the burners runs essentially at right angles relative to the direction of movement of the frame.

With the device according to the invention the thermal treatment of weeds thus takes place selectively around the plant stems; the weeds between the rows of plants can be hoed away in a simple manner.

Discharge means for the discharge of cooling medium are preferably fixed on the frame at some horizontal distance opposite the cooling medium feed means, and the burners are fixed below the cooling medium feed means, while the above-mentioned cooling medium discharge means and the above mentioned discharge means for discharging smoke gases are accommodated in or on a box.

The cooling medium feed means and the burners are also preferably accommodated in or on a box.

In order to be able to lift the parts of the leaves of the plants hanging in the danger zone out of this danger zone, the boxes can be provided at their front side, viewed in the direction of movement of the device, with run-up faces.

The boxes of each pair will be connected to each other by transverse connections at a distance above the burners.

In order to be able to pass uneven patches of the ground surface without any problem, the boxes can be suspended by parallelogram-shaped level systems so that they can swing on the frame of the device.

BRIEF DESCRIPTION OF THE DRAWINGS

The invention will now be explained in greater detail with reference to the figures, in which examples of embodiments are shown.

FIG. 1 shows a cross-section of a first device.

FIG. 2 shows a perspective view of a part of the first device.

FIG. 3 shows a perspective view of a second device according to the invention.

DETAILED DESCRIPTION OF PREFERRED EMBODIMENTS

The device shown in FIGS. 1 and 2 for the thermal killing of weeds comprises two boxes 1 and 2 which are placed next to each other with some distance between them and are connected to each other by one or more transverse connections 3.

The box 1 is divided by a partition 4 into a bottom box part 5 and a top box part 6. Fitted in the bottom box part 5 are a number of burners 7, of which the burner heads or nozzles 7a are directed at an angle towards the ground. The burners are supplied through a pipe 8 with propane or another hydrocarbon. The top box part 6 is connected by means of a hose 9 to a fan or compressed air container, and opens out into a horizontal channel 10.

The other box 2 forms a discharge means for the combustion gases (see the arrows in FIG. 1).

Viewed in the direction of movement of the device, a slanting run-up face 11 is provided at the front side of each box 1, 2, which face is for the purpose of lifting up to the level of the top surface of the boxes 1 and 2 any leaf parts hanging down during movement of the device.

FIGS. 1 and 2 show a young maize plant which is one of a row of such plants. During operation, the device, for example suspended from the rear side of a tractor, is moved in such a way that the boxes 1 and 2 are situated on either side of the row of plants.

A gaseous or liquid fuel is burned in the burners, the combustion gases being directed at the ground around the bottom part of the cultivated plants. The weeds are damaged here in such a way, through the cells being made to burst, that they die off. The bottom part of the cultivated plant stems can withstand the brief heating. In order to protect the much more fragile top part of the stems and the leaves of the cultivated plants against the heating, a cooling zone lying directly above the heating zone and consisting or air or sprayed water, is created with the hose 9, the top box part 6 and the horizontal channel 10, which cooling zone cools the cultivated plant stems above a certain level, prevents the combustion gases from rising, and also keeps the temperature of the top surface of the boxes 1 and 2 low.

The combustion gases and the cooling medium are collected in the box 2 and discharged vertically. The leaf parts of the cultivated plants lifted by the run-up face 11 during movement of the device are protected against thermal damage.

The ground around four rows of cultivated plants can be freed from weeds with the device shown in FIG. 3. Corresponding parts are provided with the same reference numbers.

Levers 14, arranged in a parallelogram, are fitted between the frame 12 of the device and the longitudinal bars 13 extending between the transverse connections 3. This means that the boxes 1 and 2 can swing up and down when there are uneven patches in the ground.

A platform on which a fan 16 and a pressure tank 17 are placed is fixed on the frame. A fuel tank (not shown) can also be placed on said platform.

The direction of movement is indicated by an arrow in FIG. 3. The fixing eye 18 is for the purpose of fixing the device to a tractor or the like. The boxes 1 and 2 can be provided with thermal insulating material on the inside.

Various modifications and additions are possible within the scope of the invention.

In the embodiment described the gas to be burned is premixed with air. It may be more practical to provide holes in the partition 4, so that the combustion air is branched off from the cooling air and pre-mixing of air and combustion gas is no longer necessary. Sprayed liquid can be used instead of cooling air.

We claim:

1. Device for thermally killing weeds near plants of a valuable crop arranged in rows, comprising: a frame which is intended to be moved in the direction of the rows of plants, at least one burner fixed to the frame, the nozzles of which are directed at or just above the ground, discharge means for combustion gases fitted at some distance opposite the burner nozzles, and feed means for feeding in cooling medium essentially at right angles to the direction of movement of the frame to form a cooling curtain at some distance above the place where the combustion gases of the burners will touch the ground, wherein the outflow direction of the burners runs essentially at right angles relative to the direction of movement of the frame.

2. Device according to claim 1, wherein said discharge means is fixed to the frame at some horizontal distance opposite the cooling medium feed means and is operative to discharge cooling medium.

3. Device according to claim 2, wherein the burners are fixed below the cooling medium feed means, and the discharge means for discharging combustion gases and cooling medium is accommodated in a box.

4. Device according to claim 3, wherein the cooling medium feed means and the burners are also accommodated in a box.

5. Device according to claim 4, wherein the boxes are provided at their front side, viewed in the direction of movement of the device, with run-up faces.

6. Device according to claim 4, wherein said boxes are connected to each other by transverse connections at a distance above the burners.

7. Device according to claim 4, wherein the boxes are suspended by parallelogram-shaped level systems so that they can swing on the frame.

* * * * *